B. A. BEARDSLY.
Bark Mill.
No. 20,692.
Patented June 29, 1858.
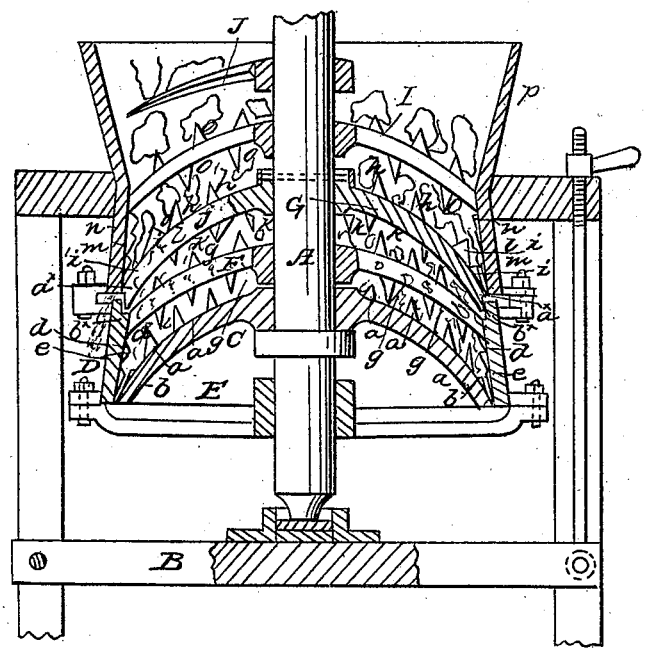
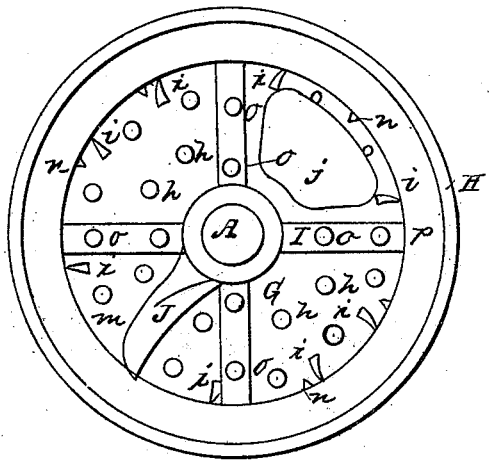
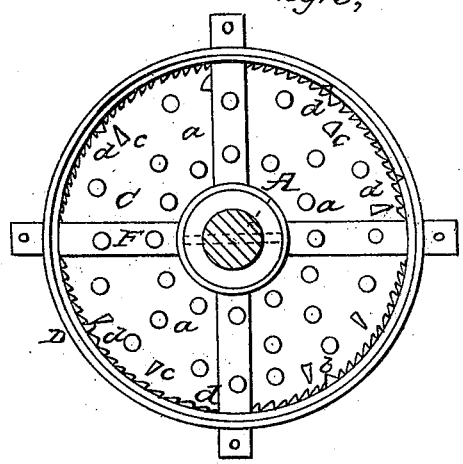

UNITED STATES PATENT OFFICE.

B. A. BEARDSLEY, OF WATERVILLE, NEW YORK.

GRINDING-MILL.

Specification of Letters Patent No. 20,692, dated June 29, 1858.

*To all whom it may concern:*

Be it known that I, BACKUS A. BEARDSLEY, of Waterville, in the county of Oneida and State of New York, have invented a new and Improved Grinding-Mill Designed more Especially for Grinding Bark for Tanning Purposes; and I do hereby declare that the following is a full, clear, and exact description of the same, reference being had to the annexed drawings, making a part of this specification, in which—

Figure 1, is a vertical central section of a mill constructed according to my invention. Fig. 2, is a plan or top view of ditto. Fig. 3, is a plan or top view of the lower grinder and the stationary arms above it.

Similar letters of reference indicate corresponding parts in the several figures.

This invention consists in the employment or use of a series of conical toothed grinding shells, stationary toothed arms, and toothed cases, constructed, combined, and arranged relatively with each other as hereinafter fully shown and described, whereby the grinding capacity of the mill, with a given driving power is greatly augmented above all others which I am acquainted.

To enable those skilled in the art to fully understand and construct my invention I will proceed to describe it.

A, represents a vertical shaft the lower end of which is stepped in an adjustable bridge-tree B, shown in red Fig. 1, and arranged in the usual or any proper way. On the lower part of the shaft A, a conical or semi-spherical cast-iron shell C, is permanently secured. This shell has upright taper or conical teeth $a$, on its upper surface, and around its lower part a finely toothed or corrugated strip $b$, is formed. Just above the toothed strip $b$, triangular projections or teeth $c$, are formed, said projections alternating with the lower row of teeth $a$, on the shell C. The shell C, is encompassed by a cast iron case D, which is of conical form provided on the upper part of its inner surface with teeth $d$, and at its lower part with fine teeth $e$, which correspond to the teeth $b$, on the shell C. The teeth $d$, are not placed very near each other as will be seen by referring to Fig. 3. The case D, is stationary, secured to any proper framing, and to the bottom of the case D, arms E, are attached, said arms crossing each other at right angles and having an aperture made through its center through which the shaft A, passes, said arms serving as a guide to the lower part of the shaft. To the upper part of the case D, arms E, are attached. These arms are of inclined or curved form corresponding to the inclination or curvature of the shell C, and cross each other at right angles, a circular opening being allowed at their point of intersection to allow the shaft A, to pass through. The arms E, are provided with conical teeth $g$, both on their upper and lower surfaces, see more particularly Fig. 1.

G, is a conical or semi-spherical shell or case which is permanently secured to the shaft A, and is provided with teeth $h$, $i$, $i'$, on its upper surface precisely similar to the teeth $a$, $b$, $c$, on shell C. Through the shell G, an orifice $j$, is made, the edges of which are made knife edged as shown in Fig. 1. The under side of the shell G, is also provided with teeth $k$, precisely similar to the teeth $a$, on shell C, and the teeth $h$, on the upper side of shell G. The lower edge of the shell G, has a rabbet formed in its lower edge all around it, said rabbet forming a shoulder or guard $a^x$, which projects over the upper edge of the case D, the lower edge of shell G, fitting in a rabbet $b^x$, made in the upper edge of the case D, see Fig. 1. The adjoining edges of shell G, and case D, are therefore fitted one into the other and a certain degree of vertical play or movement is allowed the shaft A, and consequently the shells C, G, without exposing a space between the shell G and case D. This play or movement is necessary in order that the shell G, may be adjusted to grind coarse or fine as may be desired. The employment of the guard $a^x$ serves to prevent the escape of the contents of the mill between the lower edge of shell G, and the top of the case D. If no guard were employed it would be impossible to raise the shell G, for adjustment, without leaving an opening between the shell and the case, through which the contents of the mill would immediately pass out.

H, is a case the lower end of which is bolted to the upper end of case D. The lower part of case H, designated by $l$, is of conical form corresponding in form to the case D, and its internal surface is toothed precisely similar to the interior of case D; $m$, representing the fine and $n$, the coarse teeth. Within the case H, and at the upper part of the lower portion $l$, of said case arms I, are placed. These arms cross each other at right angles and have an opening at the point of intersection for the shaft A, to pass through. The arms I, are provided with teeth $o$, both on their upper and lower surfaces. The arms I, are constructed precisely similar to the arms F, of case D. The upper part $p$, of the case H, is of inverted conical form and serves as a hopper.

J, is a cutter which is attached to the shaft A, a short distance above the arms I, see Figs. 1 and 2.

The operation is as follows: Motion is given the shaft A, by any proper means, the shells C, G, and cutter J, rotating of course with the shaft A, the arms F, I, remaining stationary. The bark to be ground is placed in the hopper or upper part $p$, of the case H, and is cut or partially crushed by the cutter J, aided by the teeth $o$, on the upper surfaces of the arms I, the teeth $o$, having a tendency to hold the bark while it is acted upon by the cutter J. The bark partially crushed passes down, and the finer portion is further acted upon by the teeth $h$, $i$, on shell G, and the teeth $n$, on the inner side of the part $l$, of the case H, and finally ground by passing between the teeth $m$, $i'$. The larger portion of the bark that cannot readily pass down between the shell G, and part $l$, of the case H, will pass down through the aperture $j$, in the shell G, and will be further crushed by the teeth $k$, on the under side of shell G, and the teeth $g$, on the upper surfaces of the arms I, and by the action of said teeth the bark will be sufficiently reduced to pass down between the shell C, and case D, and escape from between the fine teeth $e$, $b$, thereof in a properly ground state.

The mill may be made to grind coarse or fine by elevating or depressing the shaft A, so as to increase or diminish the width of the space or passage through which the bark passes.

From the above description it will be seen that a large grinding or crushing surface is obtained quite near the shaft A, for the shells C, G, may be of comparatively small diameter say 18 inches, the smallness of the diameter of the shells being compensated for by their number for it will at once be seen that any number of shells and cases may be used, the bark in passing through the mill being successively acted upon by each shell. The grinding capacity therefore of the mill may be made very great while the power required to operate or drive it will be proportionably small, in consequence of the grinding and crushing surfaces being quite near the shaft A.

I am aware that conical or semi-spherical shells toothed both on their upper and lower surface and encompassed by toothed cases have been previously used, and I am also aware that rotating toothed shells perforated to allow the bark to pass through have been used, for such device was previously patented by me, the Letters Patent bearing date Feby. 4th, 1843, but I am not aware that conical or semi-spherical toothed shells have been used in connection with stationary arms and toothed cases and arranged as herein shown, so that any number of shells may be used, and the mill made of any desired grinding capacity and at the same time rendered capable of being operated with a comparatively moderate expenditure of power, and also rendered capable of being graduated to grind fine or coarse as desired.

I do not claim therefore any of the within described parts separately considered; but,

What I claim as my invention and desire to secure by Letters Patent, is—

1. The alternate combination of grinding shells C, G, with shells F, I, the shells C, G, having a smaller diameter or curve than the shells F, I, so that by merely duplicating the above parts and employing them in connection with cases D, H, as herein shown and described, the capacity of the mill is correspondingly increased.

2. I claim providing the shell G, with a guard $a^x$ which fits into a rabbet $b^x$ in the upper part of the case D, so that shell G, may be moved vertically at pleasure without the escape of the contents of the mill between the edges of said shell and case, substantially as described.

BACKUS A. BEARDSLEY.

Witnesses:
 HULL PAGE,
 G. N. HUBBARD.